(12) United States Patent
Baldinger et al.

(10) Patent No.: US 9,109,343 B2
(45) Date of Patent: Aug. 18, 2015

(54) METHOD AND DEVICE FOR PRODUCTION OF A PIPE BED

(75) Inventors: Frank Baldinger, Freiburg-Merdingen (DE); Hubert Mauz, Donaueschingen (DE)

(73) Assignee: Frank Baldinger, Freiburg-Merdingen (DE)

( * ) Notice: Subject to any disclaimer, the term of this patent is extended or adjusted under 35 U.S.C. 154(b) by 278 days.

(21) Appl. No.: 13/113,165

(22) Filed: May 23, 2011

(65) Prior Publication Data

US 2011/0286803 A1  Nov. 24, 2011

(30) Foreign Application Priority Data

May 22, 2010  (DE) .................. 10 2010 021 335

(51) Int. Cl.
| | |
|---|---|
| *E02F 5/02* | (2006.01) |
| *F16L 1/028* | (2006.01) |
| *E02F 5/10* | (2006.01) |
| *E02D 27/46* | (2006.01) |
| *E02F 3/04* | (2006.01) |
| *E02F 5/14* | (2006.01) |
| *F16L 1/036* | (2006.01) |

(52) U.S. Cl.
CPC . *E02F 5/10* (2013.01); *E02D 27/46* (2013.01); *E02F 3/045* (2013.01); *E02F 5/145* (2013.01); *F16L 1/036* (2013.01)

(58) Field of Classification Search
CPC ............... E02F 5/02; E02F 3/045; E02F 5/10; E02F 5/145; E02F 5/102; E02D 27/46; F16L 1/036
USPC ......... 405/155, 157, 174, 175, 179, 180, 181, 405/183; 701/50, 468
See application file for complete search history.

(56) References Cited

U.S. PATENT DOCUMENTS

| | | | | |
|---|---|---|---|---|
| 4,331,280 | A * | 5/1982 | Terabayashi et al. | 228/114.5 |
| 4,877,355 | A * | 10/1989 | Van Pelt | 405/159 |
| 6,061,932 | A * | 5/2000 | Rowley | 37/309 |
| 6,478,508 | B1 * | 11/2002 | Magnani et al. | 405/179 |
| 2005/0117973 | A1 * | 6/2005 | Nelson | 405/184.5 |
| 2006/0171782 | A1 * | 8/2006 | Neiwert | 405/179 |
| 2007/0025815 | A1 * | 2/2007 | Sick | 404/84.1 |

FOREIGN PATENT DOCUMENTS

| | | |
|---|---|---|
| DE | 125149 | * 4/1977 |
| DE | 19627465 | 12/1996 |
| DE | 19940875 | 1/2001 |
| DE | 10046299 | 4/2002 |
| DE | 10229435 | 1/2004 |
| DE | 10332316 | 9/2004 |
| WO | 2006078854 | 7/2006 |

* cited by examiner

*Primary Examiner* — John Kreck
*Assistant Examiner* — Carib Oquendo
(74) *Attorney, Agent, or Firm* — Volpe and Koenig, P.C.

(57) ABSTRACT

A method and a device for producing a pipe bed or a pipe bed profiling. The method includes: digging a trench, producing a trench floor, producing the pipe bed or pipe bed profiling by a pipe-bed finisher adapted in at least one sub-region of its outer contours to the outer contours of the pipe to be laid, and on its longitudinal sides at least one guide or side element projects laterally on each of its two sides. The device has a pipe-bed finisher, shape-adapted in at least one sub-region of its outer contours to an outer contour of the pipe to be laid. The pipe-bed finisher is constructed either as a pipe profiling arbor that has at least on one front end, a finished guide tip or as a pipe profiling sleeve that has a punch-like, open or closed, concave or convex sleeve end region in the advancing direction.

17 Claims, 2 Drawing Sheets

METHOD AND DEVICE FOR PRODUCTION OF A PIPE BED

CROSS-REFERENCE TO RELATED APPLICATIONS

This application claims the benefit of German Patent Application No. 10 2010 021 335.7, filed May 22, 2010, which is incorporated herein by reference as if fully set forth.

BACKGROUND

The invention relates to a method for the production of a pipe bed or a pipe bed profiling with the following steps: a) digging a trench, b) production of a trench floor, and c) production of the pipe bed or pipe bed profiling by a pipe-bed finisher that is adapted in at least one sub-region of its outer contours to the outer contours of the pipe to be laid.

The invention is also concerned with a device for the production of such a pipe bed or a pipe bed profiling that has a pipe-bed finisher that is shape-adapted in at least one sub-region of its outer contours to the outer contours of the pipe to be laid and on whose longitudinal sides at least one guide or side element projects laterally on each of its two sides.

Pipe beds are produced according to the current prior art such that a trench is dug and then a trench floor is built according to height, gradient, and direction with the help of a laser mechanism. This trench floor must be compressed in a first compression procedure, in order to produce a stable substrate. With delivered, grain-graded, mineral bedding material, a horizontal pipe bed is produced as a base for the pipes to be laid and likewise compressed in a second compression procedure. Then the pipes being used are likewise laid according to height, gradient, and direction with the help of the laser mechanism. The pipes then lie with point supports on this compressed floor. This is problematic and undesired in a soil-static and pipe-static respect, especially for flexible plastic pipes. In a subsequent processing step, the pipe is then buried with a similarly grain-graded, mineral pipe encasing material. Now, in a third compression procedure, further compression of the material in the pipe or line zones is performed. Because a pipe requires a statically effective and load-bearing support for receiving reaction forces especially in the lower third of the pipe segment on the trench floor for pipe-static and soil-static reasons, in particular, this region of the pipe bed should be compressed in an especially good and effective manner. In no case may cavities be formed, in order to counteract undesired deformation stress on the pipes. In the previously known method, however, the pipe bed could be influenced only inadequately with the help of the mineral packing material and/or with the help of the compression energy introduced by the compression devices, especially in the area of the spaces on either side of the bottom half of the pipe, that is, the triangular-shaped zones under the pipe springing line (i.e., the horizontal center line of the pipe cross section). This still represents a little considered problem in pipe laying. A disadvantage is also that the compression effect and the degree of compression cannot be measured and cannot be logged.

The profiling blade technology described in DE 100 46 299 C1 and in DE 102 29 435 B represents a partial solution. For example, from DE 102 29 435 B, a method for the workerless, laser-controlled laying of pipes is already known. In the known method, initially a trench is dug, in order to then provide the outer contours of a pipe to be laid for the production as a pipe bed on or in the trench floor with the help of a profiling blade. Here, the profiling blade has, on its bottom side, outer contours that correspond to the peripheral contours of the pipe laid on the pipe bed. In order to be able to maintain the desired height position, a laser beam is oriented in the trench parallel to the direction of the pipe to be laid such that the laser beam always appears in a predetermined region on the profiling blade.

The continuously repeated orientation of the profiling blade according to the construction progress with respect to the desired gradient, height position, and direction of the profiling blade with respect to the laser beam require a very significant effort especially for a curved profile of the pipe guidance. In addition, however, the production result is also dependent on the fact that the pipe bed withstands the loads occurring during the construction phase and during operation and the profile geometry can be maintained. This is possible only for cohesive material. A compression of the pipe zone material does not take place here. At the contact edge between the profiling blade and the soil, a slight loosening can not be avoided. The profiled, excess soil must be removed.

From DE 196 27 465 C2, a method for the preparation of excavated material under the addition of aggregate material is already known. In order to be able to process soils that are not suitable for installation or excavated material that is not suitable for installation directly at the construction site such that it can be used for re-filling and as pipe-bed material, initially the required quantity of aggregate material is determined with respect to the excavated material to be prepared and the determined amount is forwarded to a dosing device for the aggregate material, where the required quantity of aggregate material is introduced from the dosing device into a blade separator and mixed with the quantity of excavated material located in the blade separator, wherein, during the mixing procedure, the excavated material above a certain grain size is separated out, in order to obtain a material that is suitable for installation and compression.

A pipe-bed material mixed from each of the available excavated material, however, exhibits unexpected and different material properties that possibly influence the strength and load-bearing capacity, especially in the groundwater zone.

From DE 103 32 316 B3, a method for the production of a pipe bed is already known in which, in a first processing step, a trench is dug, in order to be able to generate, in a subsequent processing step, the pipe bed through profiling of the soil with a profiling blade. Here, the profiling blade used as pipe-bed finisher has outer contours that correspond, in each case, essentially to the outer contours of the pipe in the region in which the pipe contacts the pipe bed. The profiling blade has, for this purpose, at least one projection in its lowermost region facing the pipe bed, in order to form, in the pipe bed, a groove oriented in the longitudinal direction of the pipe to be laid. The profiling blade here forms a template that is guided in the longitudinal direction of the trench above the prepared and compressed soil material. In the known method it is provided that a part of the excavated soil or also a part of the soil still located in the trench is processed corresponding to the required quality of the pipe bed or else alternative soil material, such as, for example, sand or the like, is introduced into the trench. In DE 103 32 316 B3, it is not further stated how the profiling blade can be drawn over the soil defined as the pipe bed such that the pipe bed is oriented according to the desired pipe profile.

In DE 199 40 875 C1, a method is already described in which at least one part of the excavated soil or soil sitting on the trench floor is processed, wherein the soil is homogenized during the processing and a binding agent is added to it. The soil processing in this way is then profiled by a scraper that is guided over the compressed soil in the longitudinal direction of the pipe to be laid. Here, the scraper that can be attached to a digger arm advantageously with the help of a quick-change mechanism forms a template with the help of which the required profile of the pipe bed is formed by drawing the template through the compressed soil. In order to be able to orient the template according to the desired pipe profile, the scraper is guided toward an extracting void formed by two parallel rails arranged on the two longitudinal sides of the pipe bed to be formed.

From WO 2006/078854 A2, a system is already known for the production of a pipe bed with a planing blade that is drawn over the trench bed such that the material used for the pipe bed forms a planar pipe bed for supporting the pipe. In order to be able to guide the planing blade over the trench floor, a rail-like support frame is provided on the trench floor, wherein a rolling carriage carrying the planing blade can be moved on this support frame in a position-exact manner. In order to be able to orient the relative position between the rolling carriage and the planing blade held on the carriage, hydraulic cylinders are provided. Here, for orienting the planing blade in the trench, a satellite-supported positioning control is also proposed. The known system, however, always requires the introduction of the heavy support frame into the trench, the placement of the rolling carriage carrying the planing blade, the orientation of the planing blade relative to the rolling carriage by hydraulic cylinders, and the subsequent moving of the rolling carriage on the support frame, which is associated with considerable effort in terms of machines and work.

Therefore, there is the task of creating a method and also a device of the type mentioned above with which a pipe bed or a pipe bed profiling can be produced rapidly and with little effort, which distinguishes itself across its entire longitudinal extent by a constant level of stability under loading, load-carrying capacity, compressibility, and production accuracy.

The realization of this task according to the invention is provided in the method of the type mentioned above, especially in that, for digging the pipe trench floor, a digger attachment is used that performs, from the following processing steps: digging the trench, production of the trench floor and production of the pipe bed or pipe bed profiling, at least one processing step in a coordinate-controlled manner by a coordinate or satellite, global positioning system (GPS), measurement and control unit, and that the pipe trench floor (4) is produced by a coordinate or satellite (GPS) sensor installed on the digger attachment according to height, alignment, and/or gradient according to the specified coordinates or GPS signals.

In the case of the method according to the invention, initially a trench is dug before the pipe bed or pipe bed profiling is produced by a pipe-bed finisher that is adapted in at least one sub-region of its outer contours to the outer contours of the pipe to be laid.

In order to be able to automate and streamline the laying of a pipe line and in order to be able to lay the pipe with highest possible precision on the pipe bed, the method according to the invention provides that, of the following processing steps: digging of the trench, production of the trench floor and production of the pipe bed or pipe bed profiling, at least one processing step is performed in a satellite (GPS) or coordinate-controlled manner by a satellite (GPS) or coordinate measurement and control unit. According to the state of the measurement technology or the position of the construction site (inner city, forest, etc.), work could also be performed according to the GPS method. Because a digger attachment is used for digging the pipe trench floor, for example, a rail-like support frame and the moving of a rolling carriage carrying the pipe-bed finisher on the support frame are not necessary. Instead, it is possible to use a digger attachment that keeps the effort associated with performing the method according to the invention as low as possible.

In order also to be able to dig the pipe trench floor with the highest possible precision, according to the invention it is provided that the pipe trench floor is produced by a satellite (GPS) or coordinate sensor installed on the digger attachment according to height, alignment, and/or gradient according to the specified coordinates.

After the digging of the trench, it can be preferred that at least one part of the excavated soil and/or soil sitting on the trench floor is processed and used as the pipe-bed material.

A method, however, is preferred in which, after the production of the trench floor, pipe-bed material prepared in advance with fixed or required material properties is introduced. In this processing variant, for the production of the pipe bed, a pipe-bed material that is prepared in advance at the factory and thus away from the construction site, i.e., external material, is used, and not excavated material obtained at the construction site. The pipe-bed material prepared in advance at the factory distinguishes itself by its essentially constant, fixed material properties that allow the production of a pipe bed or a pipe bed profiling with a constant level of stability under load and quality across the entire longitudinal extent. Here, for the production of the pipe bed or pipe bed profiling, a pipe-bed finisher is used that is adapted in at least one sub-region of its outer contours to the outer contours of the pipe to be laid.

Here, a preferred embodiment according to the invention provides that, as the pipe-bed finisher, a digger attachment is used with profiling, compression, and/or satellite (GPS) or coordinate-control functioning.

In order, with the help of the pipe-bed finisher used according to the invention, to be able to work the pipe bed or the pipe bed profiling quickly and with little effort into the pipe-bed material introduced into the trench floor, it is advantageous if the pipe-bed finisher is guided, advantageously in a coordinate or GPS controlled manner, like a kind of plow or like a torpedo through the pipe-bed material.

Here, the reproducibility of the processing steps required for production and the positioning accuracy of the processing results that can be achieved with the method according to the invention are promoted more if the coordinate control is controlled from a fixed point included in the geographic coordinate grid or construction-site coordinate grid.

An embodiment is preferred in which a mineral pipe-bed material is used as the pipe-bed material prepared in advance.

The quick processing that can be achieved with the method according to the invention is promoted more if a material that is reactive and/or compressible for physical or chemical activation is used as the pipe-bed material.

It is especially advantageous if the binding effect of the pipe-bed material is triggered and/or amplified by infusion with at least one additive.

It is especially preferred if the pipe-bed contours are constructed by the pipe-bed finisher.

Here, a method is preferred in which the pipe is laid into the advantageously compressed and/or set pipe bed profile.

In order to be able to more easily discover, for example, the causes for construction damage appearing only at a later time, it is useful if the compression effect of the pipe-bed finisher guided by the pipe-bed material is logged advantageously by automatic data capture.

In order to achieve high density, long service life, and good resistance against external and internal corrosion of the pipe line, it is advantageous if a flexible plastic pipe is placed or laid in the pipe-bed material.

The pipe laying technology could be automated and streamlined with the help of the method according to the invention to the greatest extent when the pipe sections of the pipe laid in the pipe-bed material are connected to each other by means of friction-welding processes.

The handling of the method according to the invention is simplified if the pipe-bed material prepared in advance advantageously at the factory is provided in bunches, containers, or silos.

The simple handling of the method according to the invention is promoted more if a pipe-bed material is used that is enriched with additives that bring about and advantageously accelerate, under the effect of vibrations, the setting of a binding agent mixed with the pipe-bed material.

The realization according to the invention of the task stated above is provided in the device for the production of a pipe bed or a pipe bed profiling especially in that the pipe-bed finisher is constructed either as a pipe profiling arbor that has a finished guide tip at least on one front end or is constructed as a pipe profiling sleeve that has, in the advancing direction, a punch-like, sleeve end region that could have, for example, an open or closed construction or could have a convex or concave shape.

The device according to the invention has a pipe-bed finisher that is shape-adapted in at least one sub-region of its outer contours to the outer contours of the pipe to be laid. Here, this pipe-bed finisher is constructed either as a pipe profiling arbor that has a finished guide tip at least on one front end or else is constructed as a pipe profiling sleeve that has, in the advancing direction, a punch-like sleeve end region, wherein this sleeve end region could have, for example, an open or closed construction or could have a concave or convex shape. In order to also be able to secure against bulging, to compress, and to plane the longitudinal sides (shoulders) bounding the pipe bed with the help of the device according to the invention, on the longitudinal sides of the pipe-bed finisher at least one guide plate or side plate projects laterally on each of the two sides.

In order to be able to plane, to extract, and to simultaneously compress the bed material or the soil material sitting there, it is advantageous if the guide or side plates are bent on the front side oriented in the advancing direction like a bow or sled skid.

One preferred refinement according to the invention provides that, in the pipe-bed finisher, an oscillation generator is installed by which the pipe-bed finisher can be set into vibrations that advantageously can be controlled in frequency, directed, and/or logged.

Refinements according to the invention are given from the following description, as well as the claims.

BRIEF DESCRIPTION OF THE DRAWINGS

The invention will be described in more detail below with reference to a preferred embodiment.

Shown in schematic representation are.

DETAILED DESCRIPTION OF THE PREFERRED EMBODIMENTS

Figure 1:
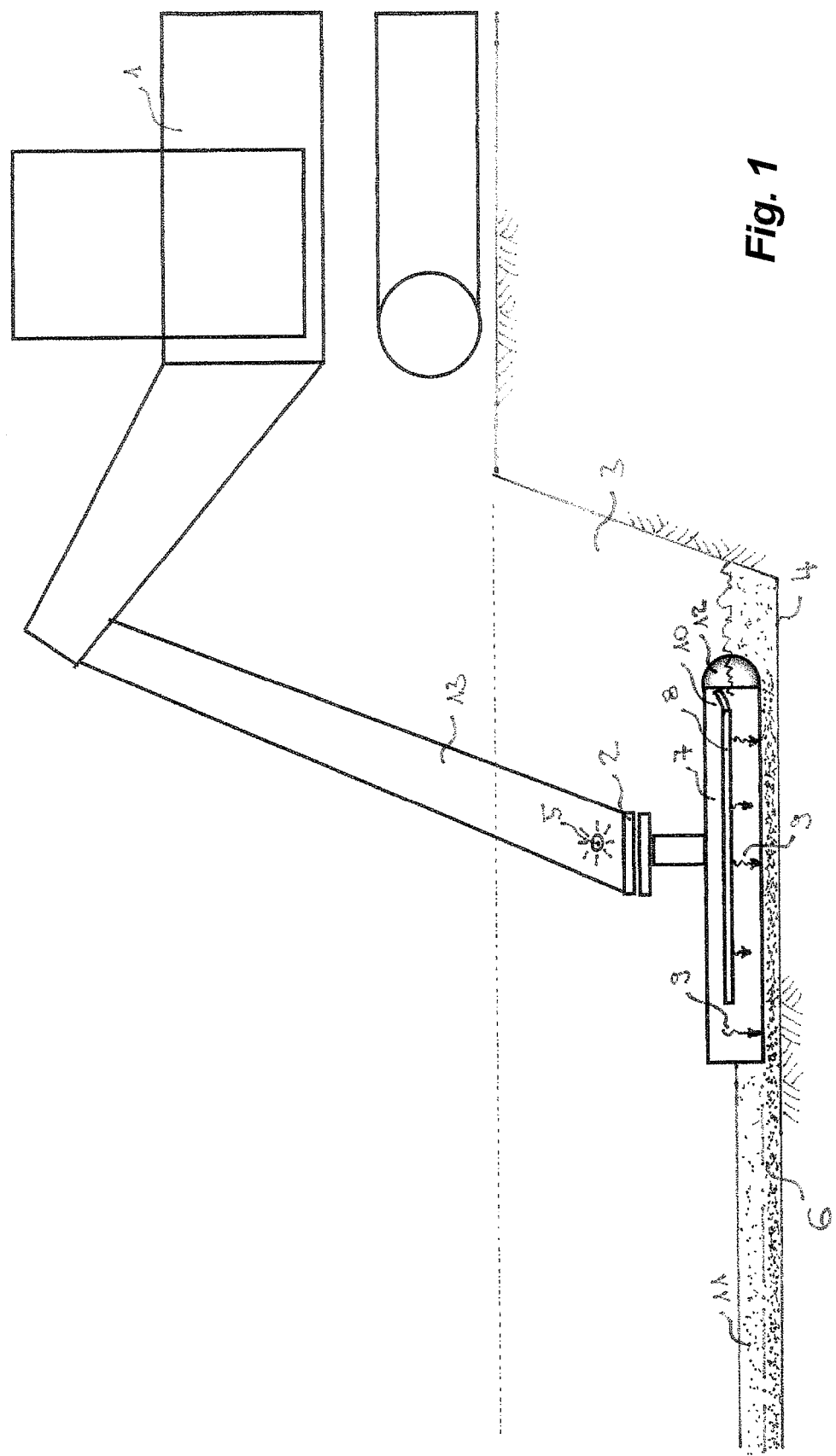
FIG. 1 is a side view of a digger that is shown in the production of a pipe bed and carries, on its digger attachment device, a pipe-bed finisher constructed here like a torpedo, with which the pipe bed required for laying a pipe line can be formed in the pipe-bed material located in the trench floor.

The present invention relates, among other things, to a method for the production of a pipe bed whose processing steps will be described in detail below with reference to FIGS. 1 and 2:

With a digger 1 of modern design, initially a pipe trench 3 is dug, in order to then produce a pipe trench floor 4. The digger 1 has an arm 13 and a digger attachment device 2 for connecting various attachments that are needed for the individual processing steps. On the digger attachment device 2 or on the attachment, a coordinate sensor 5 is installed that allows the position-exact localization of the digger 1 and its attachment with respect to a fixed point advantageously linked to the geographic coordinate grid or construction-site coordinates or works according to GPS data. With the help of the coordinate sensor 5, the pipe trench floor 4 is produced according to height, alignment, and gradient according to the specified coordinates or GPS data.

The coordinate sensor 5 transfers the received data to a display that advantageously has a target mark display. The display and especially also the target mark display allow the digger driver to track the kinematics of the digger with reference to the digital display.

In order to be able to dig the trench 3 and to manage the trench digging, initially a conventional trench shovel is docked as an attachment on the digger attachment device 2. Already, advantages are produced because, contrary to the typical pipe laying methods, the trench 3 does not have to be entered in order to measure and define the ground level according to the laser beam according to conventional technology.

In a subsequent processing step, a pipe-bed material produced at the factory is deposited onto the pipe trench floor 4 in a quantity corresponding to the trench and pipe profile. The pipe-bed material 6 is conditioned in the sense that its essential material properties are known and/or constant from batch to batch. The homogeneous pipe-bed material 6 could be a mineral, standardized, graded, and/or mortar mixture or similar bed material prepared in advance that is infused with an additive, if necessary, in order to improve the stabilization and compression of the pipe-bed material. Here, the pipe-bed material prepared in advance could also be activated and cured through physical activation, such as, e.g., directed vibrations.

In another processing step, a pipe-bed finisher 7 is then mounted on the digger attachment device 2 that here contains a profiling, compression, and coordinate or GPS control function. This pipe-bed finisher 7 is guided with the help of the coordinate or GPS sensor 5 in a coordinate-controlled way like a kind of plow through the pipe-bed material 6 such that the pipe-bed material is therefore compressed while leaving open an open space or bed channel 11 corresponding to the outer pipe contours. The pipe-bed finisher 7 is shape-adapted in at least one sub-region of its outer contours to the outer contours of the pipe to be laid and is here constructed as torpedo-like pipe profiling arbor. On at least one of its front ends, the pipe-bed finisher 7 has a tapering or finished or rounded guide tip 12 and here has, on each of its two sides, at least one plate-like or vane-like guide or side element 8 on its longitudinal sides, wherein this element projects laterally and can be bent like a bow on the front side 10 of the guide or side element 8 oriented in the advancing direction, such that the bed material 6 is to be planed, extracted, and simultaneously compressed in this way.

The pipe-bed finisher 7 is oriented by the digger driver with reference to the data that the coordinate sensor 5 records. The pipe-bed finisher can be constructed, for example, as a steel pipe that is adapted to the outer contours of the pipe to be laid. The pipe-bed finisher is advantageously produced from a cylindrical pipe; however, ovoid-profiled pipe geometries, rectangular channel pipes, pipes with horizontal base supports, or all other pipe geometries are also possible.

Figure 2:
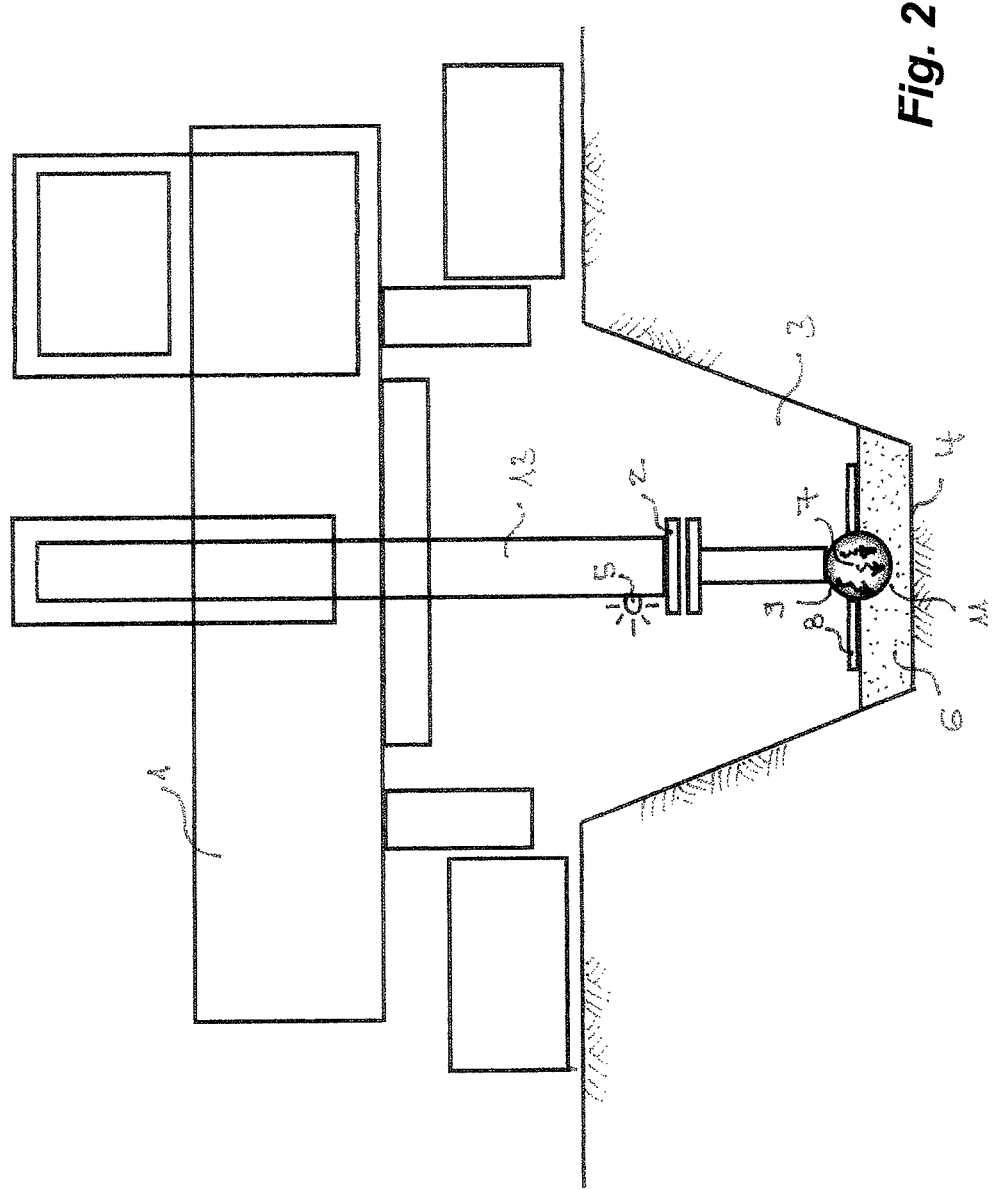
FIG. 2 is a front-side view of the digger from FIG. 1.

In FIGS. 1 and 2, it is indicated with the reference symbol 9 that in the pipe-bed finisher 7, an oscillation generator is installed by which the pipe-bed finisher 7 can be set into vibrations that advantageously can be controlled in frequency, directed, and/or logged. If the vibrating pipe-bed finisher 7 is moved by the pipe-bed material 6, then the processed pipe-bed material is activated, profiled, and compressed. The compression effect can be measured and documented by means of data capture. The bed contours of the open space 11 drawn into the pipe-bed material 6 is produced by the pipe-bed finisher and the guide or side elements projecting on its two longitudinal sides. Through the vibrations and oscillations generated with the help of the pipe-bed finisher 7, the prepared pipe-bed material 6 is activated, brought to rapid setting, and optimally compressed. Through the arbor-like formation of the pipe-bed finisher 7, a stable and load-bearing, channel-shaped open space 11 that has the shape of a semicircle or a third of a circle is produced. This channel-shaped open space 11 is adapted to the outer contours of the pipe to be laid and embedded. The pipe bed profiling produced in this way represents an optimal pipe-static and soil-static pipe bed for all types of pipe material, but advantageously also for flexible pipes. In order to produce and compress the spaces on either side of the bottom half of the pipe, the trench does not have to be entered, instead the pipe-bed finisher is used to simultaneously shape and compress the pipe bed. Because the control unit for the digger kinematics receives the values for the orientation of the pipe-bed finisher 7 in direction, height, and gradient from the coordinate or GPS sensor 5, the pipe-bed finisher 7 can be drawn exactly according to kinematic targets through the deposited bed material 6. The activated, controllable vibration oscillations of the pipe-bed finisher 7 simultaneously compress the pipe-bed material 6 and the existing subsurface or trench floor 4 during the planing procedure. The lateral guide or side elements 8 act as power trowels and compressors and compress the lateral shoulder regions of the bed material 6 and the existing subsurface.

The lateral guide or side elements 8 could be held, for example, at the springing height (half pipe height) or at any other arbitrary height on the pipe-shaped pipe-bed finisher. An embodiment is preferred, however, in which the guide or side elements 8 are held on the pipe-bed finisher at a distance underneath the pipe center plane of the pipe-bed finisher; in such an arrangement of the guide or side elements 8, the attachment of these guide or side elements 8 is desired at the one-third point of the pipe height that then generates a nearly ideal pipe support of 120 to 130 degrees.

The pipe-bed finisher 7 could be mounted with the help of a digger attachment system on the boom of a digger. The coordinate or satellite (GPS) measurement and control unit now receives the data received from the coordinate or satellite (GPS) sensor, with this data being displayed graphically on a display. The digger driver can now orient the pipe-bed finisher in an operator-tracked manner and draw it through the pipe-bed material. The direction, height, and gradient of the pipe-bed finisher drawn in the pipe-bed material are displayed on the display. During the planing procedure, the vibration oscillations that could be activated and controlled in the pipe-bed finisher compress the bed material and simultaneously also the existing subsurface. The lateral guide or side elements 8 act as power trowels and compressors and compress the lateral shoulder regions of the pipe-bed material and the existing subsurface.

In the compressed and set bed profile open space 11, the pipe to be laid can now be placed. For so-called high-density polyethylene (HDPE) friction-welded pipes, the pipe is likewise laid and welded with a friction welder designed as a digger attachment. The present invention makes possible the installation of pipes in trenches in a more economical, highly automated, and qualitatively high value way. Here, the field of application extends from the field of open channel pipes for muddy water and rainwater through the fields of water lines, empty pipes, gas lines, pipelines, long-distance energy and power distribution lines to all types of pipes, but advantageously also to the use of HDPE friction-welding pipes in connection with the associated friction welder. The compression of the pipe-bed material and the welding of the pipe produced from individual pipe sections can be tested, measured, and logged.

The method according to the invention presents itself for use especially in the novel HDPE friction-welding method. Here, in contrast to prior welding methods, like the heating-coil, resistance-welding method or the heating-couple, heat-reflector welding method, a digger attachment is also used. Such a digger attachment is able to weld HDPE pipes or other pipes that likewise can be friction welded without a socket and aligned flush on the outer wall in pipe trenches or in the profiled pipe bed channel or open space 11 finished by the pipe-bed finisher. The friction welding method of the individual pipe sections is also performed completely automatically and thus can be performed without workers in the trench. The method according to the invention allows a completely automated and thus worker-less pipe bed technology and pipe laying technology with a high quality standard. The method according to the invention replaces several previously necessary processing steps and thus contributes to considerable streamlining. The method is also advantageous for plastic, corrugated or ribbed pipes due to the compression of the spaces on either side of the bottom half of the pipe that is important here and prevention of (or against) oval shapes.

The pipes used in the method according to the invention could have a round, elliptical, rectangular, or some other cross-sectional shape. In order to be able to also lay the various pipes with different pipe outer contours in the method according to the invention with the help of the required digger attachments, it is advantageous if the bottom side of the pipe finisher is constructed by a detachable change plate, automatic docking and undocking device that comprises at least one bow plate and/or a profiling arbor. With the help of such a change plate system, different pipe dimensions and various pipe cross sections can be taken into consideration. The various cross sections could be constructed in a modular manner by double assembly bracket elements in a building-block system that can be fastened on the outer side of the advantageously torpedo-shaped pipe-bed finisher.

If pipe-bed material that is prepared in advance at the factory is to be used, then this could be provided in bunches, containers, or silos. This pipe-bed material is advantageously prepared in advance as a mineral, homogeneous mortar mixture. Here, this mortar mixture could be conditioned with a mineral binding agent that is set to react, in particular, through vibrations. Additional additives in the pipe-bed material could be provided that trigger and accelerate the setting effect under vibrations. With the help of the pipe-bed finisher and the pipe-bed material prepared in advance, a dimensionally stable, groove-shaped pipe bed like a kind of molding sand could be produced. In this pipe bed, after the pipe bed productions, pipes or other line bodies could be laid. Here, the pipe-bed finisher is navigated and controlled by the digger driver in an operator-guided manner, wherein the production of the pipe bed or the pipe bed profile can be performed without workers also in only one processing step.

The invention claimed is:

1. A method for production of a pipe bed comprising the following steps:
   a) digging of a trench,
   b) producing a trench floor,
   c) producing a pipe bed or pipe bed profiling using a pipe-bed finisher (7) having a shape in at least one sub-region of an outer contour thereof that corresponds to an outer contour of a pipe to be laid, wherein for digging a pipe trench floor (4), using a digger attachment that performs, from the following work steps: digging the trench (3), production of the trench floor (4) and production of the pipe bed or pipe bed profiling, at least one work step in a coordinate-controlled manner using a coordinate or satellite global positioning system (GPS) measurement and control unit, and wherein the pipe trench floor (4) is produced by a coordinate or satellite (GPS) sensor (5) installed on the digger attachment according to at least one of a height, alignment, or gradient according to specified coordinates or GPS signals, and wherein the pipe-bed finisher (7) is guided through a pipe-bed material (6) in a plowing manner with coordinate or satellite (GPS) control, such that the bed material (6) is planed, extracted, and simultaneously compressed by the pipe-bed finisher (7), wherein after production of the trench floor, at least one part of excavated soil and/or soil sitting on the trench floor is processed and used in the trench as pipe-bed material.

2. The method according to claim 1, wherein after production of the trench floor, a pipe-bed material prepared in advance with set or required material properties is used.

3. The method according to claim 2, wherein the pipe-bed material prepared in advance at the factory is provided in batches, containers, or silos.

4. The method according to claim 1, wherein, as the pipe-bed finisher (7), a digger attachment is used with at least one of profiling, compression, or coordinate or satellite (GPS) control functioning.

5. The method according to claim 1, wherein a control is controlled from a fixed point by a geographic coordinate grid or construction-site coordinate grid or according to GPS data.

6. The method according to claim 1, wherein, as a pipe-bed material, a mineral and/or pipe-bed material is used.

7. The method according to claim 1, wherein, as a pipe-bed material, a material is used that is reactive and/or compressible through physical or chemical activation.

8. The method according to claim 7, wherein a setting effect of the pipe-bed material (6) is at least one of triggered or reinforced by infusion, injection, or by at least one additive.

9. The method according to claim 1 wherein pipe-bed contours are formed by means of the pipe-bed finisher (7).

10. The method according to claim 1, wherein the pipe is laid in a compressed, set, and stable pipe bed profile (11).

11. The method according to claim 1, wherein a compression effect of the pipe-bed finisher (7) guided through a pipe-bed material (6) can be logged by an automatic data capture.

12. The method according to claim 1, wherein a flexible pipe is laid or placed in a pipe-bed material (6).

13. The method according to claim 1, wherein pipe sections of the pipe laid in the pipe bed profile (11) are connected to each other by friction welding.

14. The method according to claim 1, wherein a pipe-bed material used is enriched with additives that bring about, under the effect of vibration, the setting of a binding agent mixed in the pipe-bed material.

15. The method of claim 1, wherein the method is carried out by a device comprising the pipe-bed finisher (7) that is shape-adapted in at least one sub-region of an outer contour thereof to an outer contour of a pipe to be laid and having two longitudinal sides from which at least one guide or side element projects laterally on each of the two longitudinal sides, the pipe-bed finisher (7) is constructed either as a pipe profiling arbor that has a finished guide tip at least on its front end (12) wherein the at least one guide or side element is bent into a bow shape on a front side (10) oriented in an advancing direction, the guide tip (12) comprising at least one plate-like or vane-like guide on each longitudinal side thereof.

16. The method according to claim 15, wherein an oscillation generator is installed in the pipe-bed finisher (7), and using the generator, the pipe-bed finisher (7) is settable into vibrations (9) that can be at least one of controlled in frequency, directed, or logged.

17. The method according to claim 15, wherein the at least one guide or side element is bent into a sled-skid shape in an advancing direction and/or are held on the pipe-bed finisher at a distance underneath a longitudinal center plane of the pipe-bed finisher.

* * * * *